United States Patent
Yoshidomi et al.

(10) Patent No.: US 6,387,540 B1
(45) Date of Patent: May 14, 2002

(54) SACRIFICIAL CORROSION-PROTECTIVE ALUMINUM ALLOY FOR HEAT EXCHANGERS, HIGH CORROSION-RESISTANT ALUMINUM ALLOY COMPOSITE MATERIAL FOR HEAT EXCHANGERS, AND HEAT EXCHANGER USING THE SAID COMPOSITE MATERIAL

(75) Inventors: Yuji Yoshidomi; Junichiro Hirohashi, both of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/575,372

(22) Filed: May 22, 2000

Related U.S. Application Data

(63) Continuation of application No. PCT/JP99/05172, filed on Sep. 22, 1999.

(30) Foreign Application Priority Data

Sep. 22, 1998 (JP) ............................................. 10-267783

(51) Int. Cl.⁷ ................................................. B32B 15/20
(52) U.S. Cl. ........................ 428/654; 138/140; 138/141; 138/143; 428/650; 428/686
(58) Field of Search ................................. 428/650, 654, 428/686, 457; 138/140, 141, 143; 420/540, 550, 548, 553

(56) References Cited

U.S. PATENT DOCUMENTS 5,302,342 A  * 4/1994 Kawabe et al. ............. 420/548
5,460,895 A  * 10/1995 Rungta et al. .............. 428/654

FOREIGN PATENT DOCUMENTS

| EP | 0637481 A1 | 2/1995 |
|---|---|---|
| JP | A54-35810 | 3/1979 |
| JP | 5451950 | 4/1979 |
| JP | 62122745 | 6/1987 |
| JP | 01-111840 | * 4/1989 |
| JP | 3124392 | 5/1991 |
| JP | A3-124394 | 5/1991 |
| JP | 04263035 | 9/1992 |
| JP | 09-087788 A | 3/1997 |
| JP | 09-176768 A | 7/1997 |
| JP | 10-072634 A | 3/1998 |
| JP | 10-072634 | * 3/1998 |
| JP | 10072635 | 3/1998 |
| JP | 11302760 | 11/1999 |
| JP | 2000-087170 | * 3/2000 |
| JP | 10-267783 | 10/2000 |

* cited by examiner

Primary Examiner—Robert R. Koehler
(74) Attorney, Agent, or Firm—Birch, Stewart, Kolasch & Birch, LLP

(57) ABSTRACT

There is disclosed a sacrificial corrosion-protective aluminum alloy for heat exchangers which contains Zn more than 4.0 wt % but 15.0 wt % or less, 0.1 to 3.0 wt % of Fe, and 0.2 to 3.0 wt % of Ni, with the balance being made of aluminum and unavoidable impurities. There is also disclosed an aluminum alloy composite material in which the said aluminum alloy is used as the sacrificial material and a heat exchanger using the aluminum alloy composite material. According to the aluminum alloy composite material, it is possible to prevent erosion of heat-exchanger tubes when refrigerant in tube is strongly alkaline and is flowing at a high flow rate.

6 Claims, 2 Drawing Sheets

US 6,387,540 B1

SACRIFICIAL CORROSION-PROTECTIVE ALUMINUM ALLOY FOR HEAT EXCHANGERS, HIGH CORROSION-RESISTANT ALUMINUM ALLOY COMPOSITE MATERIAL FOR HEAT EXCHANGERS, AND HEAT EXCHANGER USING THE SAID COMPOSITE MATERIAL

This application is a Continuation of PCT International Application No. PCT/JP99/05172 filed on Sep. 22, 1999, which designated the United States and on which priority is claimed under 35 U.S.C. § 120, the entire contents of which are hereby incorporated by reference.

TECHNICAL FIELD

The present invention relates to a thin-walled aluminum alloy composite material to be used for automotive heat exchangers or the like. More particularly, the present invention relates to an aluminum alloy composite material, of three-layer structure, to be made into tubes as refrigerant passages of a heat exchanger formed by brazing. The present invention also relates to an aluminum alloy to be used as a sacrificial material for the said aluminum alloy composite material. Further, the present invention relates to a heat exchanger using the said aluminum alloy composite material.

BACKGROUND ART

The conventional heat exchanger made of aluminum alloy, as exemplified by the radiator shown in FIGS. 1(A) and 1(B), is constructed as follows. Tubes (1), for refrigerant to pass through, are joined together by fins (2) arranged between them. Both ends of the tubes (1) are provided with header plates (3). Thus, a core (4) is assembled. After brazing, both header plates (3) are provided with resin tanks (5a) and (5b), respectively, with packings (6) interposed between them. The fins (2) are formed from a sheet (about 0.1 mm thick) of JIS 3003 alloy incorporated with about 1.5 wt % of Zn. For protection from pitting corrosion in contact with refrigerant, the tubes are formed from a brazing sheet (0.2 to 0.3 mm thick) consisting of a core and an inside (refrigerant side) layer cladding the core. The core is w formed from JIS 3003 alloy incorporated with Si, Cu, or the like. The inside layer is formed from JIS 7072 alloy (or JIS 7072 alloy incorporated with Mg), as a sacrificial anode material. The header plate (3) is also formed from a brazing sheet (1.0 to 1.3 mm thick) of the same material used for the tubes (1).

The brazing sheet undergoes brazing in a hot atmosphere at about 580 to 610° C. Brazing causes Zn in the sacrificial anode material to diffuse into the core, as shown in FIGS. 2(A) and 2(B). The Zn-diffused layer suffers corrosion preferentially, so that pitting corrosion that occurs on the surface in contact with refrigerant does not grow deep. Thus, shallow and wide pitting corrosion occurs, and the brazing sheet exhibits good resistance to pitting corrosion for a long period of time. Shallow and wide pitting corrosion (i.e., uniform corrosion) is characteristic of the sacrificial anode alloy of Al—Zn-series (with Zn-amount usually being 3 wt % or less), Al—Zn—Mg-series, or Al—Mg—In-series. Owing to the potential difference between the core material and the sacrificial material, the sacrificial material continues to suffer corrosion preferentially even after the core has been exposed. It is presumed that the core is protected from corrosion in this way.

Recently, the flow rate of liquid in tubes has been increased, because of thinner plates for weight reduction and the requirement of high-performance of heat exchangers. Further, according to cooling water (coolant) for use, tubes are designed for strongly alkaline liquid. According to running conditions of automobiles, a large problem: That conventional sacrificial materials do not produce the effect of corrosion protection enough, and tubes are subject to erosion as well as corrosion, when the function of coolant becomes deteriorated for a certain reason, arises.

A conventional corrosion-resistant brazing sheet for heat exchangers is disclosed in JP-A No. Hei 9-87788 ("JP-A" means unexamined published Japanese patent application). The document discloses a sacrificial anode material of aluminum alloy containing 6 to 12 wt % of Zn and 0.5 to 3 wt % of Mg. This content of Zn overlaps the Zn content in the sacrificial corrosion-protective aluminum alloy of the present invention. However, these aluminum alloys entirely differ in additive elements except for Zn. The aforesaid document mentions the protection against corrosion caused by strongly alkaline coolant, but it mentions nothing about the protection against corrosion under a severer situation caused by fast-flowing liquid. The composition specified for the sacrificial material in the aforesaid document is not intended to propose a sacrificial material not only to solve the problems of corrosion but also that associated with erosion.

Other sacrificial anode materials are disclosed in JP-A Nos. Hei 9-176768 and Hei 10-72634. They are made of aluminum composite materials superior in alkaline corrosion resistance, which contain 0.1 to 3.0 wt % of Ni, 0.5 to 3.0 wt % of Fe, and also 3.0 wt % or less, or 4.0 wt % or less of Zn. These materials contain less Zn than the material of the present invention. In addition, no mention is made about their corrosion protection against fast-flowing liquid. The effects of their additive elements, especially the synergistic effects of Fe, Ni, and Zn, are different from the effects of the additive elements of the present invention.

It is an object of the present invention to provide an aluminum alloy composite material to be used for heat exchangers whose tubes are less subject to erosion when their inside is exposed to strongly alkaline refrigerant and even when the liquid flows fast.

It is another object of the present invention to provide a corrosion-protective aluminum alloy to be used as the sacrificial material for the said aluminum alloy composite material.

It is further another object of the present. invention to provide a heat exchanger using the said aluminum alloy composite material.

Other and further objects, features, and advantages of the invention will appear more fully from the following description, taken in connection with the accompanying drawings.

BRIEF DESCRIPTION OF THE DRAWINGS

FIG. 1(A) is a front view and FIG. 1(B) is an enlarged sectional view taken along the line A—A in FIG. 1(A).

FIG. 2(A) shows the state before brazing, and FIG. 2(B) shows the state after brazing.

DISCLOSURE OF INVENTION

Figure 1A:
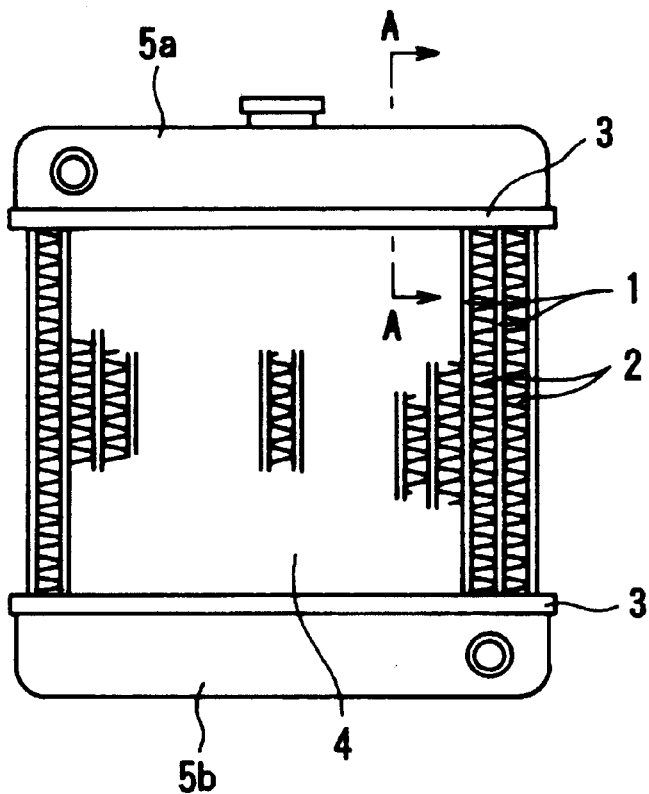
FIGS. 1(A) and 1(B) illustrate an example of a radiator.
Figure 1B:
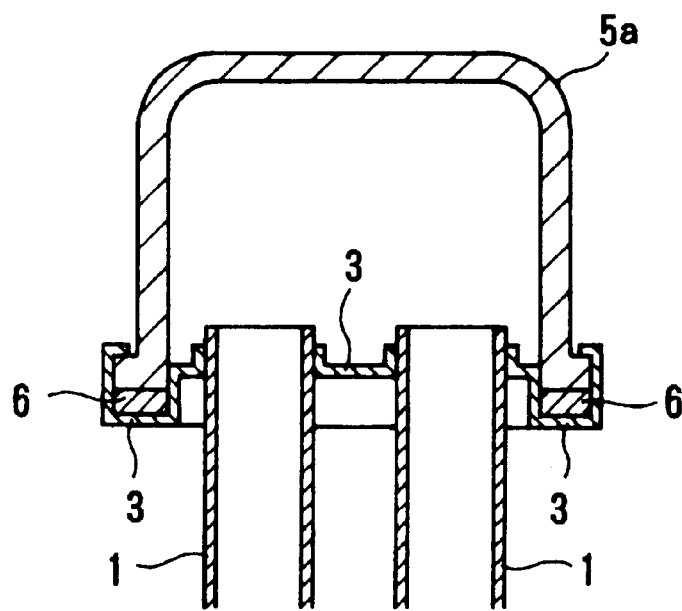
Figure 2A:
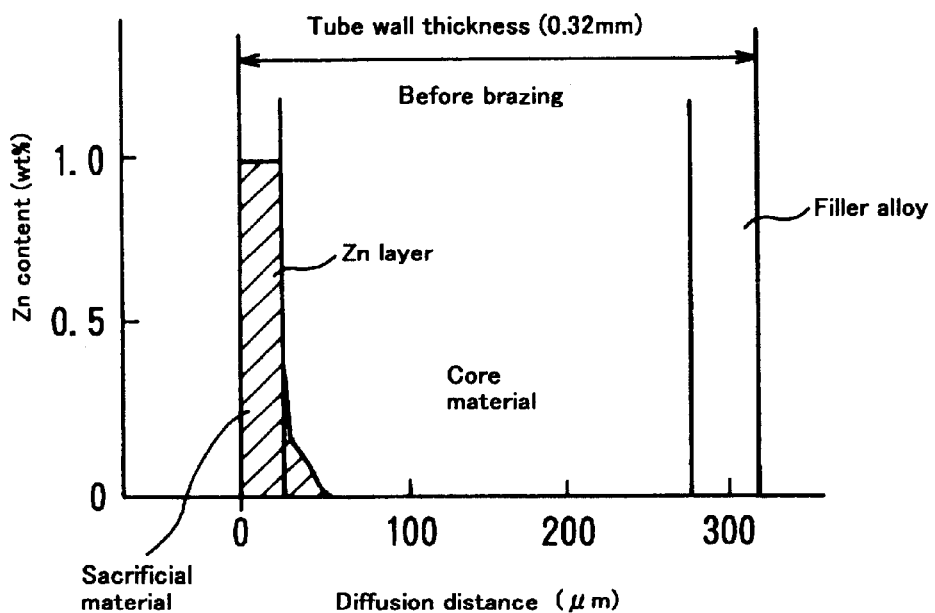
FIGS. 2(A) and 2(B) illustrate an example of the diffusion of Zn of a material for tubes.
Figure 2B:
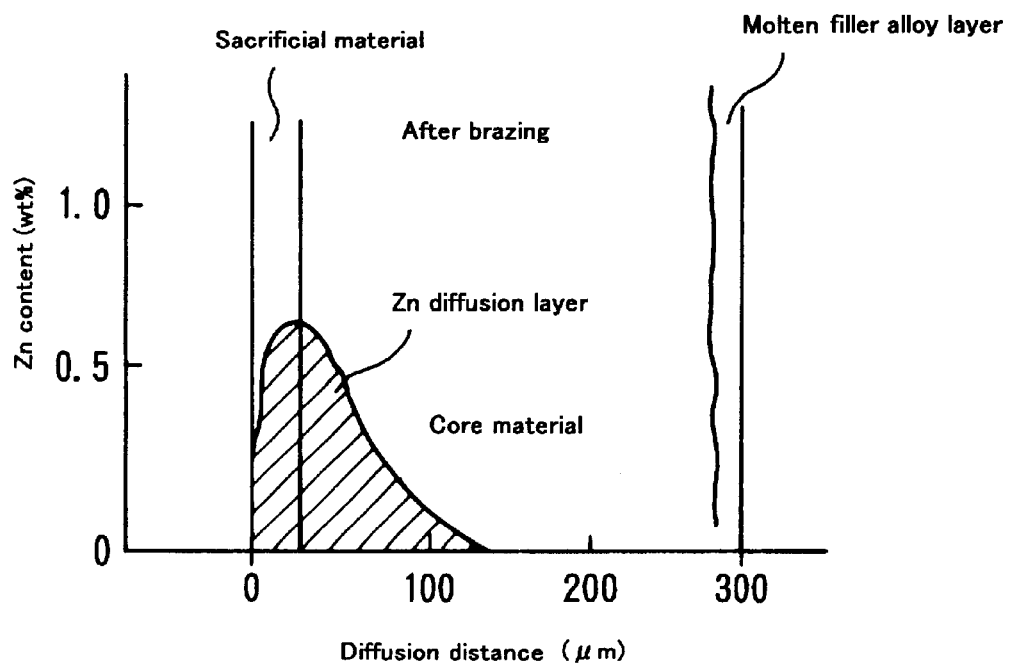

In order to solve the above-mentioned problems, the present inventors carried out extensive studies, which led to the present invention. The present invention is directed to an aluminum alloy composite material for heat exchangers which is formed by cladding a core material with an epochal sacrificial material. This sacrificial material is scarcely subject to erosion when the tube inside of refrigerant side is exposed especially to an alkaline liquid, or when the function of coolant becomes deteriorated, or even when the liquid flows very fast.

That is, according to the present invention, there are provided a sacrificial corrosion-protective aluminum alloy for heat exchangers which contains Zn more than 4.0 wt % but 15.0 wt % or less, 0.1 to 3.0 wt % of Fe, and 0.2 to 3.0 wt % of Ni, with the balance being made of aluminum and unavoidable impurities.

Further, the aluminum alloy composite material for heat exchangers of the present invention is characterized by being formed by cladding on one side of an aluminum alloy core material the said sacrificial corrosion-protective aluminum alloy as a sacrificial material and by cladding on the other side of the core material a filler alloy of Al—Si-series. The aluminum alloy core material containing 0.05 to 0.8 wt % of Fe, 0.05 to 2.0 wt % of Mn, and 0.05 to 2.0 wt % of Ni, and optionally one or more species selected from the group consisting of 0.05 to 1.2 wt % of Si, 0.003 to 1.2 wt % of Cu, 0.03 to 0.5 wt % of Mg, 0.03 to 0.3 wt % of Cr, 0.03 to 0.3 wt % of Zr, and 0.03 to 0.3 wt % of Ti, with the balance being made of aluminum and unavoidable impurities, is effectively.

According to the present invention, the heat exchanger is made using the said aluminum alloy composite material for heat exchangers.

The present inventors found that it is possible to prevent undesired corrosion and dissolution of the sacrificial material and core, effectively, if Zn is indispensably added in a specific amount (more than 4 wt % but 15 wt % or less), which is different from the Zn-amount known to be a corrosion-protective element of a sacrificial material, and Fe (0.1 to 3 wt %) and Ni (0.2 to 3 wt %) are added enforcedly. Consequently, the sacrificial anode material of the present invention is hardly vulnerable to erosion and corrosion, retaining the function of the sacrificial material for a long period of time, greatly contributing to corrosion protection, even when the coolant remains strongly alkaline or, according to the situation of use, the liquid becomes deteriorated and flows very fast.

According to the present invention, the core material has a specific composition to ensure good performance under any conditions. The composition is designed to exhibit a better balance between strength and self-corrosion resistance as compared with that of conventional alloys. This leads to more effective erosion and corrosion protection.

BEST MODE FOR CARRYING OUT THE INVENTION

A more detailed description of the invention follows.

According to the present invention, the sacrificial material is incorporated with specific elements in specific quantities for reasons explained below.

(1) Reason for the content of Zn being more than 4 wt % but 15 wt % or less

When a cooling liquid (coolant) is strongly alkaline (pH about 8 to 11), the spontaneous electrochemical potential of the sacrificial material tends to become higher than that of the core material, with potential difference between the sacrificial material and the core material, for corrosion protection, decreasing. It follows that electrical potential of the sacrificial material containing 4 wt % or less of Zn becomes more noble than that of the core material, greatly decreasing corrosion resistance, if the sacrificial material is used in combination with the core material in industrial use, or in combination with the core material pertaining to the present invention. Even though electrical potential of the sacrificial material is more base than that of the core material, the spontaneous potential of the sacrificial material approaches the pitting potential of the core material, and the sacrificial material suffers self-corrosion in the form of pitting faster, decreasing life against corrosion accordingly. The above-mentioned documents (JP-A Nos. Hei 9-176768 and Hei 10-72634) treat Zn as an optional element, respectively contained in an amount of 3 wt % or less, and 4 wt % or less. Thus, it is difficult to conceive, from these documents, that the content of Zn must be more than 4 wt % for the material to be used against fast-flowing liquid. Incidentally, with the Zn content in excess of 15 wt %, the sacrificial material itself decreases in melting point, to such an extent that it could melt at an ordinary brazing temperature.

The present invention specifies the amount of Fe and Ni as essential components in the sacrificial material in order to solve problems with corrosion due to fast-flowing liquid. For these elements to fully function, it is important that Zn is added to, as an indispensable element, in an amount of more than 4 wt % but 15 wt % or less. The amount of Fe and Ni necessary for Zn to produce the synergistic effect is specified for the reason explained in (2) below.

The Zn content specified above is essential for the sacrificial material to produce its minimum required sacrificial corrosion-protective effect in the above-mentioned corrosive environment. A Zn content ranging from 5.0 wt % to 10 wt % is more preferable than a Zn content in excess of 4.0 wt % and less than 5.0 wt %, or a Zn content in excess of 10 wt % and no more than 15 wt %, because its corrosion resistance in acid environment becomes more excellent.

(2) Reason the Fe content is 0.1 to 3 wt %, and the Ni content is 0.2 to 3 wt %, respectively, in the sacrificial material The present inventors found, contrary to conventional belief, that it is important for the sacrificial material to form, on its surface, a stable hydroxide film when it is exposed to a strongly alkaline (pH about 8 to 11) and fast-flowing cooling liquid (coolant), and this hydroxide film suppress the corrosion of the sacrificial material and core material. A sacrificial material based on Al—Zn-series forms a Zn-series hydroxide film on its surface. It is essential for the film to remain stable and strong for a long period of time, and for that, it is necessary to add not only Zn but also Fe and Ni, as essential components.

Fe forms an Al—Fe—Si-series compound having a particle size of about 1 to 5 $\mu$m. Ni forms an Al—(Fe)—Ni—Si-series compound, which is the above-mentioned compound with Fe partly replaced by Ni, because Ni has a character to replace Fe and bond.

When exposed to the above strongly alkaline liquid flowing fast, preferentially dissolution occurs near the above compounds, but, at the same time, the compounds have ability to form a corrosion film in their vicinity. Since these compounds are uniformly distributed in the sacrificial material, the corrosion films are also uniformly distributed. The films formed in the vicinity of these compounds respectively react together with the Zn-series hydroxide films formed by dissolution in the matrix of the material's texture. The resulting effect is that the films become compact, stable, and strong.

The thus-formed films are liable to break into layers when exposed to the above-mentioned fast-flowing liquid. Even though the films break into layers, the underlying sacrificial material may undergo the ideal sacrificed uniform corrosion, if the sacrificial material is incorporated with the specific amount of Zn as mentioned above.

This effect will not be fully produced if the amount of Fe is less than 0.1 wt %, because Fe-series compounds are distributed only sparsely. The resulting product will be very poor in ductility if the amount of Fe exceeds 3 wt %. Thus the amount of Fe is preferably 0.2 to 2.5 wt %, more preferably 0.4 to 2.0 wt %.

The above-mentioned effect will not be fully produced if the amount of Ni is less than 0.2 wt %, because the amount of the compound containing Ni is not enough. Ni in excess of 3 wt % tends to cause a problem of cracking at the time of casting. The amount of Ni is preferably 0.5 to 2.0 wt %, more preferably 0.8 to 1.5 wt %.

The core material is incorporated with several elements whose amounts are specified for the reasons given below.

Mn dissolves in the matrix, forming solid solution, after brazing, and contributes to strength. In the case where the core material is used in combination with the sacrificial material of this invention, a specific amount of Mn is highly effective for corrosion protection mentioned above. According to the present invention, the amount of Mn is 0.05 to 2.0 wt %. An amount less than 0.05 wt % is not enough to increase strength, and an amount in excess of 2.0 wt % causes a problem of an adverse effect on workability. The amount of Mn is preferably 0.3 to 1.5 wt %, more preferably 0.7 to 1.2 wt %.

Although the core material does not originally contain Zn, it comes to contain Zn, Fe, and Ni when its composite material clad with the sacrificial material is used for heat exchangers. This is because Zn diffuses from the sacrificial material into the core material if the latter contains Fe and Ni enforcedly. Therefore, Zn in the core material contributes to corrosion protection against a fast-flowing alkaline liquid as in the case of Zn incorporated into the sacrificial material.

In an acid environment, corrosion often starts at Fe-series compounds. However, Zn added in an amount specified above ensures corrosion protection.

An amount of Fe less than 0.05 wt % is not enough to produce the desired effect. An amount of Fe in excess of 0.8 wt % adversely affects balance of corrosion resistance in an acid environment and an alkaline environment. The amount of Fe is preferably 0.2 to 0.75 wt %, more preferably 0.4 to 0.7 wt %.

Ni is added to in an amount of 0.05 to 2 wt %. An amount of Ni less than 0.05 wt % is not enough to produce the above-mentioned effect. An amount of Ni in excess of 2 wt % adversely affects rolling-ductility. The preferable amount of Ni is 0.3 to 1.5 wt %.

An amount of Si less than 0.0 wt % is not enough to contribute to strength. An amount of Si in excess of 1.2 wt % leads to deep pitting corrosion due to Si in the form of simple substance. Si can be added to in an amount of 0.3 to 0.9 wt % preferably.

Cu can be added to in an amount of 0.003 to 1.2 wt %. An amount of Cu less than 0.003 wt % is not enough to produce the above-mentioned effect. An amount of Cu in excess of 1.2 wt % adversely affects the self-corrosion resistance of the core material, a problem of promoting grain bounding corrosion, or might lead to weld cracks during electric welding. The preferable amount of Cu is 0.005 to 0.05 wt % or 0.4 to 0.8 wt %, in accordance with a condition for use.

Mg combines with Si in the core material to form $Mg_2Si$ compound which precipitates on aging, thereby contributing to strength. Mg less than 0.03 wt % does not improve strength. Mg in excess of 0.5 wt % diffuses, upon heating for brazing, to the surface in contract with the filler alloy clad on one side of the core material. If a flux is used, the diffused Mg reacts with the flux, resulting in poor brazing. Preferably, Mg can be added in an amount of 0.08 to 0.25 wt %.

Cr, Zr, and Ti can be added in an amount of 0.03 to 0.3 wt %, respectively. Therefore, they produce the same effect as that of Fe and Ni. With an amount less than 0.03 wt %, they do not produce their effect. With an amount in excess of 0.3 wt %, they might cause cracking during solidification by casting. Preferably, Cr, Zr, and Ti can be added in an amount of 0.08 to 0.25 wt %, respectively.

Other elements than mentioned above may also be added so long as they have no adverse effect on the characteristic properties.

The core material and sacrificial material may be produced in any manner, such as casting methods of direct chill casting, continuous casting (strip caster), or the like. Conditions of homogenizing treatment, hot rolling, cold rolling, process annealing, or the like, are not limited.

Examples of the filler alloy used in the present invention include, Al—Si-series alloys specified by JIS 4343, JIS 4045, and JIS4004, or the like. This filler alloy may be incorporated with Cu, Zn, or other elements so long as it retains its brazability.

The filler alloy may bond to the core material by clad-rolling as specified in the present invention, or by spray coating or powder coating without any adverse effect on the present invention.

The aluminum alloy composite material according to the present invention may be applied to radiator tubes and heater tubes as well as radiator header plates and heater header plates. They may also be applied enough to any other members to be used for the same purpose as intended by the present invention.

The aluminum alloy composite material according to the present invention keeps good sacrificial corrosion-protective performance not only in alkaline corrosive environments but also in acidic corrosive environments, and it is excellent in corrosion resistance suppressing pitting corrosion for a long period of time. In addition, the sacrificial corrosion-protective aluminum alloy according to the present invention permits the sacrificial material to greatly improve erosion resistance in an environment which easily brings about erosion. It is apparent from the foregoing that the aluminum alloy and aluminum alloy composite material of the present invention solve problems with conventional materials and produce a remarkable industrial effect.

EXAMPLES

The invention will be described in more detail with reference to the following examples which are not intended to restrict the scope of the invention.

Twenty eight kinds of alloys, each having the composition shown in Table 1, for the sacrificial anode material and the core material were prepared by die casting. Respectively, after facing of both sides, the ingot for the sacrificial material was hot-rolled into a 5-mm thick sheet. The hot-rolling was started at 500° C. The ingot for the core material underwent homogenizing annealing at 520° C. for 6 hours. It was finished to a thickness of 40 mm by facing. Thus the thickness of the sacrificial material clad equals 10% of the total thickness of the composite material.

The filler alloy was prepared from JIS 4343 alloy by die casting in the same way as the sacrificial material. After facing, it was hot-rolled into a 5-mm thick sheet. Thus the thickness of the filler alloy clad equals 10% of the total thickness of the composite material.

The three layers of the filler alloy, the core material, and the sacrificial material, were placed in this order on top of the other. Hot-rolling was started at 500° C., and the three layers were hot-rolled into a 3.5-mm thick three-layer clad material. The clad material was cold-rolled into a 0.357-mm thick sheet. Cold rolling was followed by process annealing at 360° C. for 2 hours and finish cold rolling into a 0.25-mm thick sheet. Thus there was obtained samples of H14 material made of aluminum alloy composite material.

Solution: city water +5 ppm Cu ions +100 ppm Cl ions

Test conditions: Test was conducted by repeating cycle test, alternately, for five months, which cycle consist of test of for 10 hours at 80° C. and test of 14 hours at room temperature.

(2) Resistance to Circulated Alkaline Solution

The solution specified below was circulated (at a flow rate of 2 m/sec) in the tubes of the core of the heat exchanger mentioned above.

Solution: A commercial coolant was diluted to 30 vol % of the coolant concentration with city water, and the diluted coolant was incorporated with 1 ppm Cu ions, 20 ppm Fe

TABLE 1

| Composite Material | No. | Composition of core material (wt %) | | | | | | | | | | Composition of sacrificial material (wt %) | | | |
|---|---|---|---|---|---|---|---|---|---|---|---|---|---|---|---|
| | | Si | Fe | Cu | Mn | Cr | Zr | Ti | Mg | Ni | Al | Zn | Fe | Ni | Al |
| Examples of This Invention | 1 | 0.49 | 0.20 | 0.14 | 1.0 | — | — | — | — | 0.3 | balance | 5.8 | 0.8 | 0.5 | balance |
| | 2 | 0.34 | 0.7 | 0.51 | 1.2 | — | — | 0.14 | 0.1 | — | " | 4.5 | 0.2 | 0.4 | " |
| | 3 | 0.49 | 0.65 | 0.007 | 0.8 | — | — | 0.16 | — | — | " | 6.9 | 1.2 | 0.7 | " |
| | 4 | 0.6 | 0.24 | 0.008 | 1.1 | — | — | — | — | — | " | 8.5 | 0.9 | 1.0 | " |
| | 5 | 0.41 | 0.29 | 0.005 | 1.04 | — | — | — | — | 1.2 | " | 11.2 | 1.3 | 1.5 | " |
| | 6 | 0.27 | 0.41 | 0.004 | 0.86 | — | 0.2 | — | — | — | " | 5.0 | 0.7 | 0.5 | " |
| | 7 | 0.22 | 0.35 | 0.006 | 0.91 | — | — | 0.15 | — | — | " | 9.1 | 1.0 | 0.3 | " |
| | 8 | 0.14 | 0.53 | 0.008 | 0.8 | 0.15 | — | — | — | 0.45 | " | 13.5 | 1.7 | 2.0 | " |
| | 9 | 0.85 | 0.15 | 0.007 | 0.52 | — | 0.1 | — | — | — | " | 7.3 | 0.8 | 1.6 | " |
| | 10 | 0.98 | 0.10 | 0.009 | 0.67 | — | — | — | — | — | " | 4.2 | 1.0 | 0.35 | " |
| | 11 | 0.75 | 0.30 | 0.003 | 0.32 | — | 0.15 | — | — | — | " | 10.9 | 1.8 | 2.5 | " |
| | 12 | 0.55 | 0.21 | 0.51 | 1.38 | — | — | — | — | — | " | 8.0 | 0.7 | 0.9 | " |
| | 13 | 0.37 | 0.43 | 0.42 | 1.07 | — | — | — | — | 1.0 | " | 4.4 | 0.7 | 1.2 | " |
| | 14 | 0.41 | 0.55 | 0.50 | 0.9 | — | — | — | — | 0.5 | " | 5.0 | 1.0 | 0.5 | " |
| | 15 | 0.12 | 0.35 | 0.82 | 0.82 | — | 0.18 | — | — | — | " | 7.5 | 0.8 | 0.6 | " |
| | 16 | 0.5 | 0.25 | 0.71 | 0.90 | — | — | — | 0.10 | — | " | 9.5 | 1.2 | 2.0 | " |
| | 17 | 0.22 | 0.2 | 0.85 | 0.75 | — | 0.13 | — | — | 0.61 | " | 10.8 | 1.5 | 2.4 | " |
| | 18 | 0.88 | 0.6 | 0.27 | 1.2 | — | — | — | — | 0.43 | " | 5.2 | 0.7 | 0.8 | " |
| | 19 | 0.72 | 0.30 | 0.29 | 1.1 | — | — | — | — | — | " | 9.6 | 1.3 | 1.4 | " |
| | 20 | 0.65 | 0.4 | 0.34 | 0.33 | — | 0.08 | 0.12 | — | — | " | 14.0 | 0.5 | 1.7 | " |
| Comparative Examples | 21 | 0.50 | 0.29 | 0.007 | 1.14 | — | — | — | — | — | " | 2.0 | 0.3 | — | " |
| | 22 | 0.52 | 0.31 | 0.1 | 1.22 | — | — | — | — | 0.2 | " | 8.5 | 1.0 | — | " |
| | 23 | 0.48 | 0.21 | 0.004 | 1.02 | — | — | — | — | — | " | 18.5 | 0.15 | 1.0 | " |
| | 24 | 0.6 | 0.27 | 0.3 | 1.2 | — | 0.1 | — | — | — | " | 1.5 | 1.2 | 1.5 | " |
| | 25 | 0.8 | 0.28 | 0.56 | 0.8 | — | — | 0.1 | — | — | " | 8.5 | 0.15 | — | " |
| | 26 | 0.48 | 0.29 | 0.3 | 1.12 | — | — | — | — | — | " | 3.6 | 0.2 | 0.7 | " |
| | 27 | 0.8 | 0.4 | 1.55 | 1.3 | — | — | — | — | — | " | 2.0 | 0.1 | — | " |
| Conventional Example | 28 | 0.31 | 0.42 | 0.151 | 1.10 | — | — | — | — | — | " | 1.0 | — | — | " |

Note: "—" means "not contained".

Each sample of the alloy composite materials (Nos. 1 to 20) according to the present invention, the alloy composite materials (Nos. 21 to 27) for comparison, and the alloy composite material (No. 28) for a conventional example was made into a tube by electric welding. A heat exchanger was made from this tube in combination with fins, header plates, and side plates specified below. Fin: corrugated sheet, 0.07 mm thick, made of an alloy containing Al-0.5 wt % Si-0.2 wt % Cu-1.0 wt % Mn-2.0 wt % Zn. Header plate: 1.2 mm thick. Side plate: aluminum alloy composite material composed of a core layer (JIS 3003+0.15 wt % Mg), a 10% clad layer of filler alloy (JIS 4343), and a 10% clad layer of sacrificial material (Al-1.5 wt % Zn).

The heat exchanger underwent the following three kinds of corrosion tests. The maximum depth of the pitting corrosion that had occurred from the side of the sacrificial material was measured. The results are shown in Table 2.

Conditions of Solutions for Corrosion Tests
(1) Resistance to Circulated Acid Solution The solution specified below was circulated (at a flow rate of 2 m/sec) in the tubes of the core of the heat exchanger mentioned above.

ions, 40 ppm sulfate ions, and 10 ppm Cl ions. This solution was finally adjusted to pH 10.5 with NaOH, and was used as a corrosive solution.

Test conditions: Test was conducted by repeating cycle test, alternately, for five months, which cycle consist of test of for 10 hours at 80° C. and test of 14 hours at room temperature.

(3) Resistance to Erosion by Alkaline Solution

Solution: A corrosive solution containing 1 ppm Cu ions, 20 ppm Fe ions, 40 ppm sulfate ions, and 100 ppm Cl ions. This solution was adjusted to pH 11 with NaOH.

Test conditions: Test gear has a nozzle of 4 mmφ in diameter to spray the solution, and the nozzle was placed 10 mm perpendicularly away from the sample. Test was rate of 6 m/sec for one month at 80° C.

TABLE 2

| Composite material | No. | Maximum depth of pitting corrision after acidic corrosion test (μm) | Maximum depth pitting corrosion after alkaline erosion test (μm) | Maximum depth of pitting corrosion after alkaline corrosion test (μm) |
|---|---|---|---|---|
| Examples of This invention | 1 | 45 | 55 | 50 |
| | 2 | 50 | 50 | 55 |
| | 3 | 35 | 35 | 50 |
| | 4 | 40 | 40 | 50 |
| | 5 | 35 | 45 | 40 |
| | 6 | 40 | 40 | 45 |
| | 7 | 40 | 45 | 50 |
| | 8 | 70 | 35 | 35 |
| | 9 | 30 | 30 | 45 |
| | 10 | 70 | 45 | 55 |
| | 11 | 40 | 45 | 30 |
| | 12 | 45 | 55 | 45 |
| | 13 | 45 | 55 | 45 |
| | 14 | 50 | 50 | 50 |
| | 15 | 50 | 65 | 45 |
| | 16 | 60 | 50 | 40 |
| | 17 | 70 | 45 | 35 |
| | 18 | 50 | 55 | 50 |
| | 19 | 45 | 70 | 40 |
| | 20 | 55 | 65 | 35 |
| Comparative Examples | 21 | 90 | penetrated | penetrated |
| | 22 | 70 | penetrated | 60 |
| | 23 | Clad rolling was impossible due to excess Zn in sacrificial material. | | |
| | 24 | penetrated | penetrated | penetrated |
| | 25 | 50 | penetrated | 55 |
| | 26 | penetrated | penetrated | penetrated |
| | 27 | Clad rolling was impossible due to excess Cu in core material. | | |
| Conventional Example | 28 | 70 | penetrated | penetrated |

It is apparent from Table 2 that the alloy composite materials Nos. 1 to 20 pertaining to the present invention exhibited good corrosion resistance, with pitting corrosion not deeper than 70 μm, in the corrosion tests with both acid solution and alkaline solution.

In addition, they also exhibited good corrosion resistance, with the maximum depth of pitting corrosion being 70 μm or less, in the erosion test with strongly alkaline solution at a high flow rate.

By contrast, it was impossible to make the comparative sample No. 23, because cracking occurred during hot rolling of the sacrificial material, due to its excess Zn content. It was also impossible to make a composite material for the comparative sample No. 27, because cracking occurred during clad rolling of the core, due to its excess Cu content.

The comparative samples Nos. 21, 24, and 26 were poor in corrosion resistance to alkaline solution, because their sacrificial materials contain Zn but not in an amount specified in the present invention, and hence a necessary potential difference was not produced between the sacrificial material and the core material under alkaline conditions.

The comparative samples Nos. 22 and 25 exhibited poor corrosion resistance in the alkaline erosion test, because their sacrificial materials contain Ni but not in an amount specified in the present invention, and hence they did not form a stable surface film when exposed to an alkaline corrosive solution flowing at a high flow rate.

Industrial Applicability

The aluminum alloy composite material of the present invention retains good corrosion resistance by an excellent sacrificial corrosion-protective effect that can prevent pitting corrosion for a long period of time, not only in an acidic environment but also in an alkaline corrosive environment. In addition, it has a sacrificial material that exhibits greatly improved erosion resistance, even in an erosion-prone environment. Therefore, it is suitable for heat exchangers requiring high corrosion resistance.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An aluminum alloy composite material for heat exchangers which is formed by cladding one side of an aluminum alloy core material with a sacrificial corrosion-protective aluminum alloy which contains Zn more than 4.0 wt % but 15.0 wt % or less, 0.1 to 3.0 wt % of Fe, and 0.2 to 3.0 wt % of Ni, with the balance being made of aluminum and unavoidable impurities, and by cladding the other side of the core material with a filler alloy of Al—Si-series, wherein the aluminum alloy core material contains 0.05 to 0.8 wt % of Fe, 0.05 to 2.0 wt % of Mn, and 0.05 to 2.0 wt % of Ni, with the balance being made of aluminum and unavoidable impurities.

2. A heat exchanger using the aluminum alloy composite material for heat exchangers as claimed in claim 1.

3. An aluminum alloy composite material for heat exchangers which is formed by cladding one side of an aluminum alloy core material with a sacrificial corrosion-protective aluminum alloy which contains Zn more than 4.0 wt % but 15.0 wt % or less, 0.1 to 3.0 wt % of Fe, and 0.2 to 3.0 wt % of Ni, with the balance being made of aluminum and unavoidable impurities, and by cladding the other side of the core material with a filler alloy of Al—Si-series, wherein the aluminum alloy core material contains 0.05 to 0.8 wt % of Fe, 0.05 to 2.0 wt % of Mn, and 0.05 to 2.0 wt % of Ni, and one or more alloying elements selected from the group consisting of 0.05 to 1.2 wt % of Si, 0.003 to 1.2 wt % of Cu, 0.03 to 0.5 wt % of Mg, 0.03 to 0.3 wt % of Cr, 0.03 to 0.3 wt % of Zr, and 0.03 to 0.3 wt % of Ti, with the balance being made of aluminum and unavoidable impurities.

4. A heat exchanger using the aluminum alloy composite material for heat exchangers as claimed in claim 3.

5. An aluminum alloy composite material for heat exchangers which is formed by cladding one side of an aluminum alloy core material with a sacrificial corrosion-protective aluminum alloy which contains Zn more than 4.0 wt % but 15.0 wt % or less, 0.1 to 3.0 wt % of Fe, and 0.2 to 3.0 wt % of Ni, with the balance being made of aluminum and unavoidable impurities, wherein the aluminum alloy core material contains 0.05 to 0.8 wt % of Fe, 0.05 to 2.0 wt % of Mn, and 0.05 to 2.0 wt % of Ni, with the balance being made of aluminum and unavoidable impurities.

6. An aluminum alloy composite material for heat exchangers which is formed by cladding one side of an aluminum alloy core material with a sacrificial corrosion-protective aluminum alloy which contains Zn more than 4.0 wt % but 15.0 wt % or less, 0.1 to 3.0 wt % of Fe, and 0.2 to 3.0 wt % of Ni, with the balance being made of aluminum and unavoidable impurities, wherein the aluminum alloy core material contains 0.05 to 0.8 wt % of Fe, 0.05 to 2.0 wt % of Mn, and 0.05 to 2.0 wt % of Ni, and one or more alloying elements selected from the group consisting of 0.05 to 1.2 wt % of Si, 0.003 to 1.2 wt % of Cu, 0.03 to 0.5 wt % of Mg, 0.03 to 0. 3 wt % of Cr, 0.03 to 0.3 wt % of Zr, and 0.03 to 0.3 wt % of Ti, with the balance being made of aluminum and unavoidable impurities.

* * * * *

UNITED STATES PATENT AND TRADEMARK OFFICE
CERTIFICATE OF CORRECTION

PATENT NO.     : 6,387,540 B1  Page 1 of 1
DATED          : May 14, 2002
INVENTOR(S)    : Yuji Yoshidomi and Junichiro Hirohashi It is certified that error appears in the above-identified patent and that said Letters Patent is hereby corrected as shown below:

<u>Title page,</u>
Item [56], FOREIGN PATENT DOCUMENTS, please delete the following:
"JP 10-267783  10/2000"

Signed and Sealed this

Twenty-ninth Day of October, 2002

*Attest:*

*Attesting Officer*

JAMES E. ROGAN
*Director of the United States Patent and Trademark Office*